Sept. 20, 1966 L. A. SMITZER 3,273,567

FILE CARD RETRIEVAL DEVICE

Filed Oct. 17, 1962 5 Sheets-Sheet 1

Inventor:
Louis A. Smitzer
By Hill, Sherman, Meroni, Gross & Simpson Attys

Sept. 20, 1966 L. A. SMITZER 3,273,567

FILE CARD RETRIEVAL DEVICE

Filed Oct. 17, 1962 5 Sheets-Sheet 2

Inventor:
Louis A. Smitzer
By Hill, Sherman, Meroni, Gross & Simpson
Attys.

Sept. 20, 1966 L. A. SMITZER 3,273,567

FILE CARD RETRIEVAL DEVICE

Filed Oct. 17, 1962 5 Sheets-Sheet 3

Inventor:
Louis A. Smitzer
By Hill, Sherman, Meroni, Gross & Simpson
Attys.

FILE CARD RETRIEVAL DEVICE

Filed Oct. 17, 1962

Inventor:
Louis A. Smitzer:
By Hill, Sherman, Meroni, Gross & Simpson
Attys.

Sept. 20, 1966 L. A. SMITZER 3,273,567

FILE CARD RETRIEVAL DEVICE

Filed Oct. 17, 1962 5 Sheets-Sheet 5

Inventor:
Louis A. Smitzer
By Hill, Sherman, Meroni, Gross & Simpson
Attys.

United States Patent Office 3,273,567

Patented Sept. 20, 1966

3,273,567

FILE CARD RETRIEVAL DEVICE

Louis A. Smitzer, Chicago, Ill., assignor to Bell & Howell Company, Chicago, Ill., a corporation of Illinois Filed Oct. 17, 1962, Ser. No. 231,216

14 Claims. (Cl. 129—16.1)

This invention relates to improvements in filing systems utilizing coded cards, and more particularly concerns a new and improved device for retrieving selected cards from a haphazardly filed collection of individually coded cards maintained in an orderly pack or racked relation in an appropriate file receptacle.

The present application is a continuation-in-part of my copending application Serial No. 231,215 filed of even date herewith. Reference may be had to that application for various structural features equally adaptable to or with which the present retrieval unit may be used. In the present application a substantially modified and in some respects improved construction of the retrieval unit is disclosed.

According to both the copending application and the present application the invention resides in novel card retrieval apparatus, and especially such apparatus operating on the principle of magnetic extraction of stored cards. For this purpose, the cards are equipped with coded magnetic means and the retrieval unit has magnetic extraction means and card selecting means associated therewith adapted to be set by the operator or file clerk to select any card or cards responding to a particular code determination while rejecting all other cards in the course of relative searching movement of the retriever and the pack of cards in the file.

One of the problems encountered in this type of retrieval is that of code permutation capacity of the unit to afford as large as practicable a range of coded selection responsiveness and thus enable use of the retrieval unit with file receptacles, drawers or the like of increased card capacity.

At the same time, the size or bulk and weight of the retrieval unit should be as small and within as reasonable limits of compactness as practicable.

Further, the retrieval unit should be of adequate operational versatility enabling not only manual motivation thereof but also powered actuation for searching large capacity files.

Therefore, an important object of the present invention is to provide a new and improved file card retrieval device which will meet all of the foregoing problems and requirements.

Another object of the invention is to provide a new and improved card retrieval apparatus operating on the principle of magnetic extraction, wherein a relatively small, compact retrieval unit is operable to retrieve selected cards from a large number of cards in a filing receptacle by a relative movement of the retrieval unit and the receptacle.

A further object of the invention is to provide a novel magnetic card retrieval device affording not only increased coding permutation capacity but also simplified means for effecting selected card retrieval.

Still another object of the invention is to provide a novel card retrieval apparatus embodying improved plural, balanced rotary magnet card extraction means.

Yet another object of the invention is to provide a novel card retrieval apparatus having improved coded card selecting means.

A still further object of the invention is to provide a new and improved magnetic card retrieval device having novel card withdrawing means.

A yet further object of the invention is to provide an improved card retrieval unit having novel means for racking retrieved cards.

It is also an object of the invention to provide an improved automotive file card retrieval unit.

Other objects, features and advantages of the present invention will be readily apparent from the following detailed description of a preferred embodiment thereof, taken in conjunction with the accompanying drawings, in which.

Figure 1:
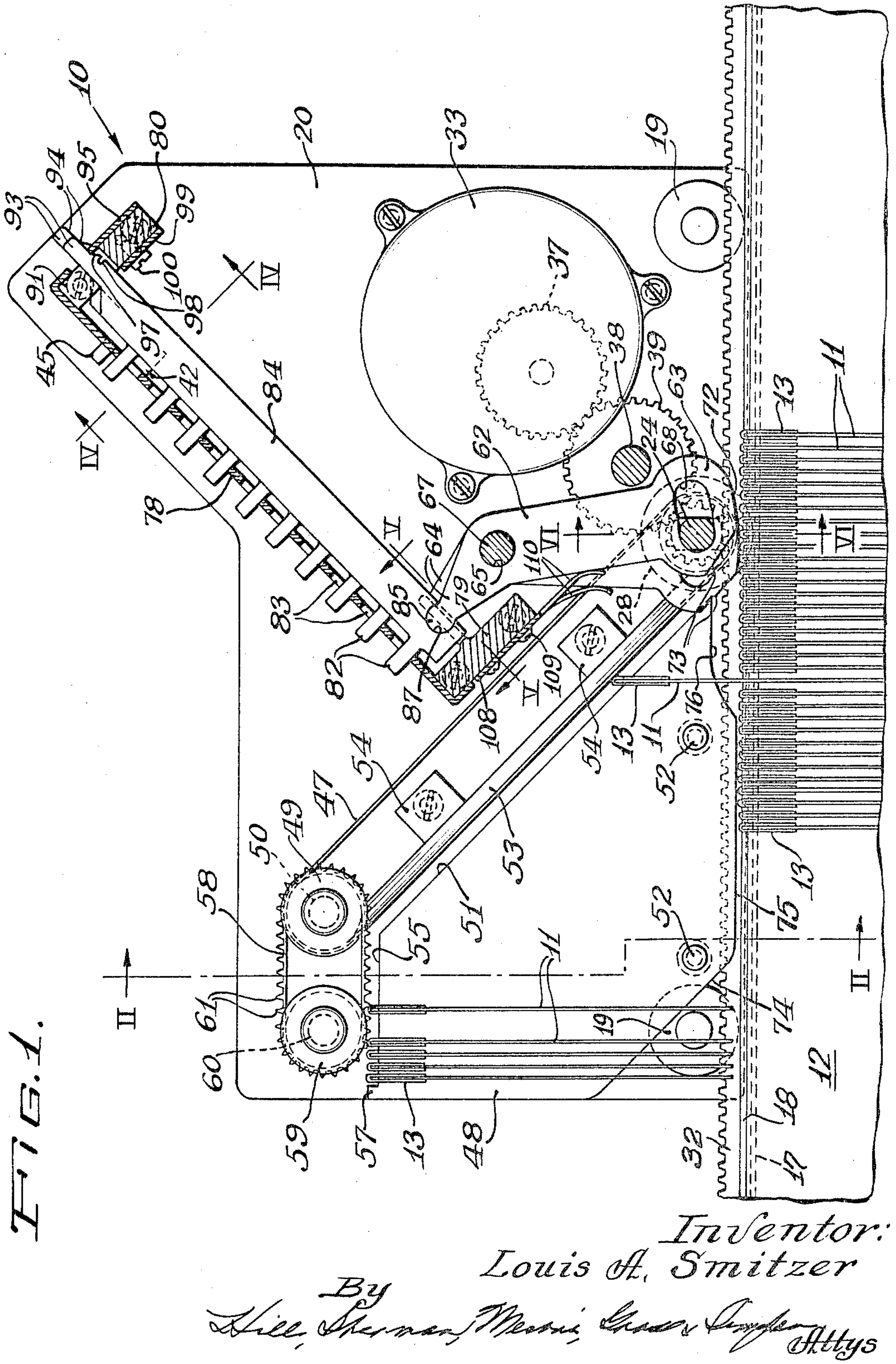
FIGURE 1 is a vertical longitudinal sectional elevational detail view through a file card retrieval unit embodying features of the present invention and showing the same in the course of withdrawing a selected card that has been magnetically extracted from a pack or set of stored file cards.

A card sorting or retrieval unit 10 (FIGS. 1, 2 and 3) is constructed and arranged to extract and withdraw code selected file cards 11 from a horizontal stack or pack supported in a storage receptacle structure 12 which may be in the form of an open file drawer, a filing cabinet tray, or the like. While the receptacle 12 may be a selfcontained unit, it may comprise a card supporting rack structure of a filing cabinet, and it may be stationary or longitudinally or circularly movable, as a pull-out drawer or as a powered tray structure, or any other preferred arrangement. In any event, according to the principle of operation of the retrieval unit 10, card retrieval is efficiently accomplished by relative movement of the retriever unit 10 and the card support or receptacle 12 in a longitudinal retrieval path.

Although the file cards 11 have been depicted as substantially wider than long (FIGS. 1 and 2), they may be of any preferred dimensions to serve a desired purpose, and the various associated, complementary features of the apparatus are adapted to be correspondingly modified. These cards 11 may be made from any suitable material and may be of unbroken face or may be provided with apertures, windows and the like as, for example, where they mount filmed records such as on microfilm to be scanned or viewed in a microfilm viewer. The entire card may comprise a film negative or a positive print of a picture, or any other kind of documentry record suitable in generally card or sheet form. The term "card" should therefore be understood in a generic and not a limiting sense.

Magnetic extraction sorting of the cards 11 is enabled by providing each card on one margin with magnetic means, desirably comprising a doubled-over strip of magnetic or magnetically attractive thin sheet metal, such as a ferromagnetic material. This magnetic strip 13 provides a bar tab preferably extending along the entire normally upper edge of the card 11, with the connecting web between the two legs of the strip overlying the card edge. Thereby, in addition to magnetic means the tab strip 13 provides substantial reinforcement for the upper margin of the card.

Furthermore, the magnetic tab strip 13 provides a hanger bar having end portions thereof in the form of projections or lugs 14 extending beyond the opposite side edges of the card body. Desirably, the hanger lugs 14 are of equal width and project to equal length from the uppermost portions and as integral extensions from the tab strip or bar 13.

In the receptacle 12, the cards 11 are supported by means of the end lugs 14 in a preferably vertical position with their upper edges in alignment in a substantially common plane. To this end, spaced upright longitudinally extending side walls 15 of the receptacle 12 provide supporting rack means on which the end lugs 14 engage in card supporting relation. Conveniently such rack means comprise respective outwardly projecting coplanar reinforcing and supporting flanges 17 on the respective side walls 15. Effective supporting structure is thereby provided for the cards 11 which can thus hang freely vertically in face-to-face relation in a set or pack of cards of any desirable number.

Figure 2:
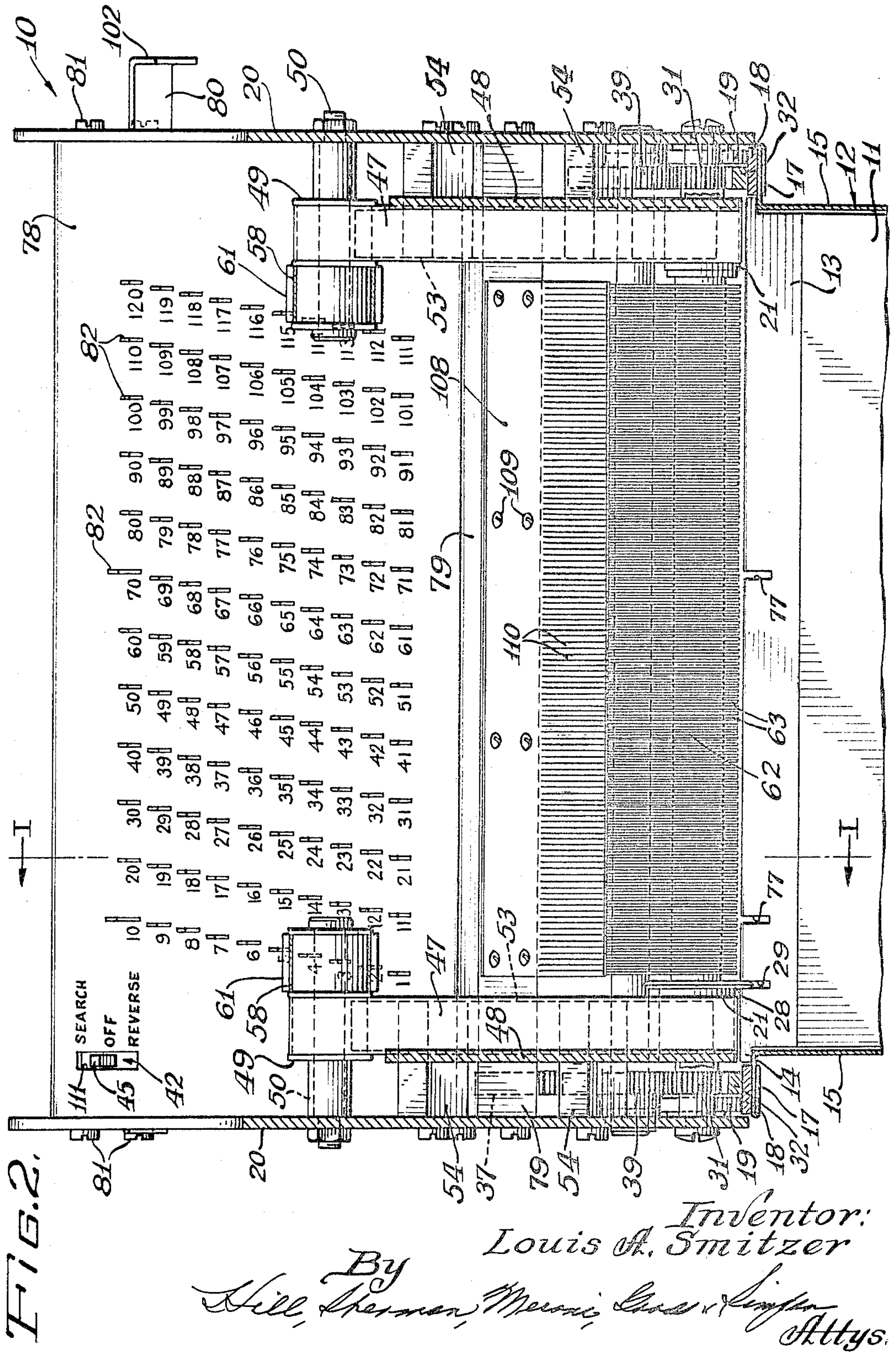
FIGURE 2 is a vertical sectional elevational detail view transversely across the retrieval unit and taken substantially on the line II—II of FIGURE 1.
Figures 6, 7, 8:
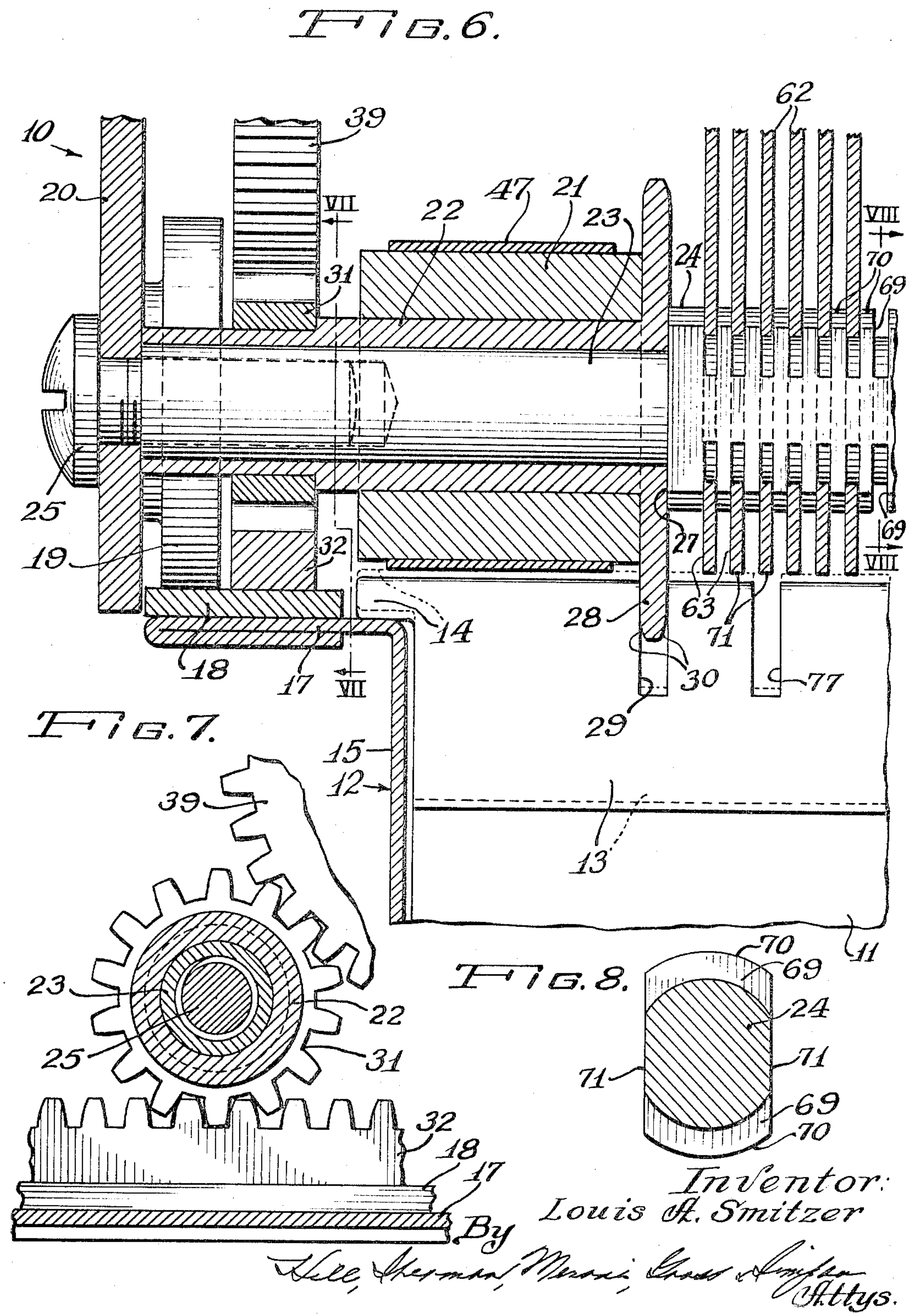
FIGURE 6 is a greatly enlarged fragmentary sectional detail view taken substantially on the line VI—VI of FIGURE 1.
FIGURE 7 is a fragmentary sectional elevational detail view taken substantially on the line VII—VII of FIGURE 6.
FIGURE 8 is a fragmentary sectional detail view taken substantially on the line VIII—VIII of FIGURE 6.

In addition to providing support for the cards 11, the flanges 17 herein serve as supporting means for the retriever unit 10, and more particularly provide rails along which the retriever unit is adapted to be relatively moved longitudinally in card sorting, retrieving and withdrawing relation. For this purpose, the respective supporting, rail flanges 17 are preferably equipped with reinforcing, wear resisting track strips 18 on which carriage roller wheels 19 of the retriever unit 10 ride in substantially anti-friction relation. These wheels are rotatably attached to and support a carriage frame including respective spaced and aligned substantially identical side frame plates 20 of the retriever carriage. The spacing of the frame plates 20 is such that their lower margins guidingly oppose the respective outer edges of the track strips 18 by depending below the top faces of the track strip substantially as shown in FIGURES 2 and 6. Through this arrangement, convenient, separable support for the retrieval unit 10 is afforded in respect to the receptacle 12, proper orientation of the unit with respect to the cards 11 is maintained either during motivation of the unit 10 to run longitudinally along the tracks 18 relative to the receptacle 12 or the receptacle 12 is moved longitudinally relative to the unit 10 for sorting one or more selected cards from the pack of cards 11, and the retrieval unit 10 is portable since it may readily be lifted away from the receptacle 12 and utilized in searching for selected cards from any other similar receptacle whether a fixed file or a file drawer, or the like.

Retrieval of stored cards is accomplished during relative movement of the retrieval unit 10 and the receptacle 12 in the card retrieving path by magnetic means functioning to attract the magnetic tabs 13 of the cards. For purposes of efficiency, such magnetic means comprise a pair of magnets 21 (FIGS. 2, 3 and 6) located for engagement with the respective opposite end portions of the magnetic tabs 13 or with separate magnetic means on the opposite end portions of the upper margins of the cards 11 if a continuous tab strip is not desired. This location of the retriever magnets 21 is desirable because it enables balanced extraction of the cards without requiring any means to compensate for possible skewing of the cards during retrieval. Moreover, individually substantially smaller magnets 21 are effective for the purpose than a single magnet. Further, an advantageous longitudinal extent between the end portions of the card margin and between the magnets 21 is left free and available for efficient selection coding.

Desirably, the magnets 21 are rotatably driven wheels or rolls each mounted corotatively on a tubular, bushing shaft 22, as exemplified in FIGURE 6. Axle for the tubular shaft 22 is provided by a complementary reduced diameter cylindrical end bearing portion 23 of a supporting bar or rod member 24 suitably attached between and to the side frame members 20 as by means of attachment bolts or screws 25. This arrangement and the length of the respective magnet rolls 21 is such that the magnets overlie a suitable respective end portion of the magnetic tab structure 13 of the cards, inclusive of the lug projection 14 and with the lowermost tab-attracting nip of the rolls 21 aligned in the same plane and spaced a limited distance above the substantially common plane across the top edges of the cards 11 as defined by the respective magnetic tabs 13 adequate for clearance purposes but close enough to assure strong card extracting magnetic attraction between the extraction nips of the magnetic rolls 21 and the magnetic card tabs.

Figure 3:
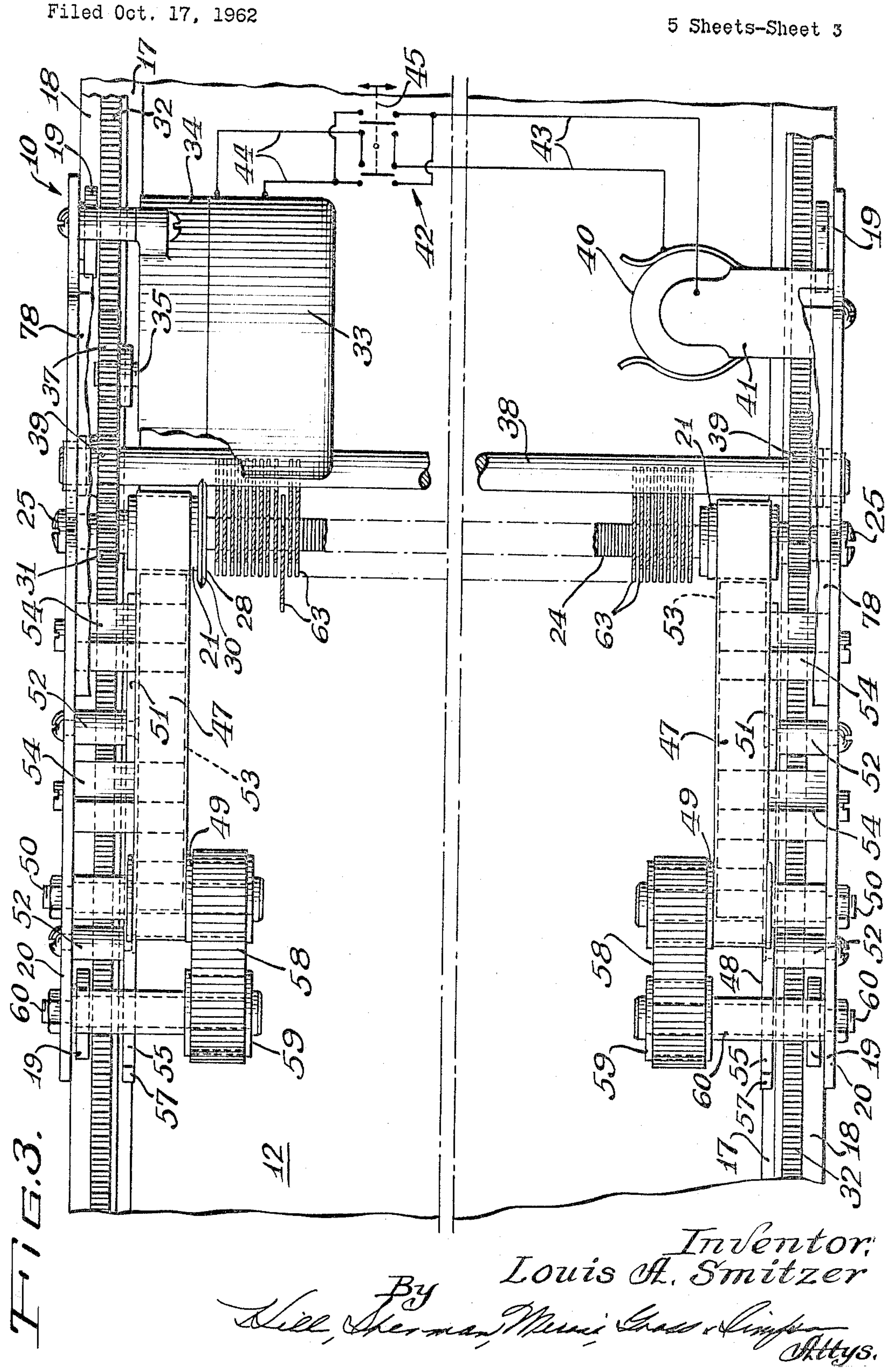
FIGURE 3 is a fragmental top plan view of the retrieval unit, with certain structure broken away to facilitate the illustration.

Longitudinal orientation of the shaft 22 is afforded by having one end opposed to the adjacent side frame member 20. At its opposite end the shaft 22 is maintained in such longitudinal orientation by an opposing shoulder 27 of a larger diameter central portion of the supporting bar member 24. A quite fixed longitudinal orientation of the supporting bar member 24 is maintained by drawing of its ends fixedly against the respective end plate members 20 by means of the screws 25. As a result of this substantially accurate longitudinal orientation and alignment of the shaft 22, it is feasible and advantageous to afford means thereon conveniently comprising an alignment disk flange 28 on the inner end portion of at least one of the shafts 22, herein the one at the left side of the machine as shown in FIGURES 2, 3 and 6, coactive with complementary means in the form of an accurately located notch 29 in the reinforcing tab strip 13 of each of the cards. The width of the notch 29 is closely complementary to the width of the alignment flange 28. Alignment entry of the flange 28 into the slot 29 is facilitated by having the sides of the perimeter portion of the disk tapered at 30 as shown. Through this arrangement, as the retrieval unit 10 and the pack of cards 11 move in the relative longitudinal card sorting path, proper alignment of the cards longitudinally of their edges with the retrieval mechanism is effected even though substantial clearance, as shown in FIGURES 2 and 6, is provided between the side edges of the cards below the hanger lugs 14 and the supporting structure and more particularly the sides 15 of the receptacle 12.

Means are provided for effecting operational rotation of the retrieval rolls 21 correlated with relative card sorting movements of the retrieval unit 10 and the receptacle 12. To this end, each of the retrieval magnet shafts 22 has rotary drive means connected therewith, conveniently comprising for balanced torque and corotational relationship a respective pinion gear 31 fixedly corotatively mounted thereon outwardly adjacent to the end of the respective magnet roll 21 and overlying the receptacle flange 17 and more particularly the track strip 18 inwardly relative to the carriage supporting roller wheels 19. Each of the pinions 31 meshes with a respective rack 32 fixedly mounted longitudinally on the track strip 18 throughout the operational range of travel of the carriage 10 relative to the receptacle 12. Through this arrangement, the shafts 22 and thereby the magnetic rolls 21 are rotatably coordinated to rotate in unison. While the rack bars 32 may be molded or machined in one piece with the track bars or strips 18, they may, as shown, be formed separately and secured together for purposes of selection of materials. By proper choice of gear ratio between the pinions 31 and the teeth of the racks 32, a desirable correlation of peripheral or rotary travel of the retrieval rolls 21 and the relative linear travel of the retrieval unit 10 and the receptacle 12 is afforded and the rotary speed of the rolls 21 can be proportioned to the linear speed of travel to attain the desired results.

Although the retrieval unit 10 is adapted to be actuated manually, means are preferably provided for automatic powered operation by means of a prime mover structure such as a reversible electric motor 33 (FIGS. 1 and 3) suitably mounted on one of the side frame members 20 through a companion gear box 34 from which projects a driven shaft 35 having mounted corotatively thereon a driving gear 37. Driving power is transmitted equally to each of the pinions 31 through a transmission shaft 38 suitably rotatably mounted on and between the frame members 20 of the retriever carriage and having corotatively mounted thereon respective transmission gears 39 which mesh drivingly with the respective pinions 31. In addition, one of the transmission gears 39 meshes in driven relative with the driving gear 37 (FIG. 7). Through this arrangement, not only is the retrieval unit 10 caused to travel along the receptacle 12, or the receptacle 12 caused to travel relative to the retrieval unit 10 where the retrieval unit is held stationary, but the rotary magnets 21 are synchronously driven.

Desirably, the motor 33 is of the reversible type, and although it may be electrically powered in any preferred manner such as by picking up current from stationary tracks through a brush contact arrangement, a preferred arrangement provides the electric current source in a self-contained manner on the carriage of the retrieval unit 10 as by the provision of one or more batteries 40 (FIG. 3) supported by suitable bracket structure 41 mounted on the carriage frame. Any suitable circuitry employing any desirable arrangement of operating control switches may be employed, one simple arrangement being shown schematically in FIGURE 3 and comprising a three-way switch 42 having connected thereto leads 43 from the battery 40 and leads 44 from the motor. This switch includes a control lever 45 and suitable contact structure and operating mechanism whereby the circuit is open in a neutral or "off" position of the operating lever, is designed to effect searching driving operation of the motor 33 in one motor energizing position of the switch lever and reverse driving energization of the motor 33 in the oppositely swung position of the lever. Any suitable additional, limit switches, feeler switches, sensing switches may be provided in the electrical circuit as desired according to known electrical practices.

Card sorting is effected by attraction of the magnetic tabs 13 to the magnetic retrieval rolls 21 and partial withdrawal of the cards by following of the associated magnetic tab 13 of the card with the off-running side of the magnetic rolls. Although either the front or rear off-running side of the rolls 21 will function for this purpose, in the illustrated example the front off-running side of the magnetic rolls has been assigned this function.

Since the magnetic retrieval rolls 21 are of relatively small diameter, means are provided for completing withdrawal of the selected card or cards 11 from the pack of cards after only a limited initial extraction, liftout movement of the card. In a practical arrangement such lifting out is completed as an uninterrupted continuation of the liftout cycle initiated by the magnetic retrieval rolls through a pickoff conveyor system including endless friction conveyor belt 47 associated with each of the retrieval rolls (FIGS. 1–3 and 6). These conveyor belts 47 are trained over the rotary magnets 21 which thereby serve as driving pulleys for the belts. Since the conveyor belts are quite thin, they do not interfere with magnetic attraction of the magnetic tabs 13 to the magnetic rolls and tendency of the tabs to adhere thereto in the off-running rotation of the rolls.

Mounting and arrangement of the conveyor belts 47 is such that they cooperate with respective fixed conveyor and card receiving rack structure conveniently in the form of respective plate members 48 in fully withdrawing the selected card 11 and racking it clear of the pack of cards and convenient for removal from the retrieval unit 10. To this end, each of the conveyor belts 47 is tensioned over an idler pulley 49 rotatably mounted on a stub shaft 50 carried by the adjacent frame member 20 of the retriever carriage on an axis located substantially above and forwardly relative to the retrieval roll axis to afford an upwardly and forwardly inclined conveyor run of the conveyor belt tangent to the perimeter of the associated magnetic roll at such an angle to the horizontal and so related to the speed of sorting travel of the retriever and the linear speed of the conveyor belts as driven by the magnetic rolls to effect substantially straight-out withdrawal of the selected card in the continuous sorting travel of the retriever.

As extraction of one of the cards 11 is initiated and its magnetic tab 13 is drawn toward the sorting nips of the magnetic rolls 21, as indicated in dash outline in FIGURE 6 and against the intervening conveyor belts 47 looped about the rolls, the magnetic tab continues following upwardly with the off-running side of the rolls until the conveyor runs of the belts 47 diverge tangentially from the magnetic rolls and thus break the magnetic grip or attraction between the magnetic rolls and the magnetic tab by pressing against the top edge of the magnetic tab. As the magnetic tab is thrust away from the magnetic rolls 21, the respective end lugs 14 are directed toward respective complementary upwardly and forwardly oblique conveyor edges 51 provided upon the conveyor plate members 48 which for this purpose are mounted in alignment with the end lugs 14 as by means of attachment and spacer studs 52 extending inwardly from the respective frame members 20 of the retriever carriage. The spacing between the conveyor runs of the belts 47 and the respective conveyor edges 51 is preferably such as to afford free travel of the magnetic tab lugs 14 during elevation and withdrawal of the associated card 11 from the card file.

Conveying engagement between the tab 13 and the belts 47 is maintained positively throughout the extent of the overhead conveyor run of each of the belts by means comprising a magnetic backup strip or bar 53 in each instance, supported by respective brackets 54 suitably secured to the adjacent frame member 20. As will be observed in FIGURES 1 and 3, each of the magnetic backup strips 53 has its lower end closely adjacent to the associated magnetic roll 21 so that there is a continuous magnetic lifting action on the tab 13 of the card being withdrawn from the moment that the tab engages the conveyor belt 47 in a card extracting relation. That is, there is a continuity of magnetic attraction from the magnetic retrieval rolls 21 to the magnetic conveyor bars 53, with the intervening conveyor belt through its frictional engagement with the magnetic tab 13 thrusting thereagainst due to the magnetic attraction continuously moving the tab and thereby attached card in withdrawal direction during sorting travel of the retriever 10. During this straight-out withdrawal of the cards by the conveyor runs of the belts 47 any tendency of any card to hold back or drop away from the conveyors is countered by opposition to the end lugs 14 of the inclined conveyor track edges 51, until withdrawal of the card has been completed and the end lugs are delivered to respective forwardly extending upper end supporting hanger rack edges 55 on the members 48, leading from the upper ends of the edges 51. To hold the foremost retrieved card against running off the forward ends of the supporting rack edges 55, upstanding respective stop lugs 47 on the members 48 are provided at such forward ends.

To assist in positive racking of the retrieved cards and to prevent canting or skewing of the cards on the supporting rack, respective endless card stacking or racking conveyor belts 58 are provided which are trained over inward extensions of the pulleys 49 alongside the conveyor belts 47 and horizontally tensioned by running over forwardly disposed idler pulleys 59 carried rotatably by suitable stub shaft 60 projecting inwardly from the respective side frame members 20 on an axis parallel to the pulleys 49. A series of outwardly projecting teeth 61 is provided equally on each of the racking belts 58 and the teeth are aligned on the two racking belts so that as each of the retrieved cards 11 is brought into racking position with respect to the racking edges 55, the upper edge of the card encased in the magnetic, reinforcing strip 13 is engaged between a pair of aligned teeth on each of the corunning racking belts 58 and the card is thereby positively propelled forwardly on the supporting rack. By having the teeth 61 of resiliently flexible, rubbery construction, the teeth can flex and bend without undue resistance over the magnetic strip clad edges to those cards which have been racked or stacked on the rack.

Selection of cards 11 according to a digital code system is provided for by improved means forming part of the retrieval unit 10. For this purpose, a set of selector barrier code bars 62 (FIGS. 1–3 and 6) is reciprocably mounted for individual generally reciprocal setting adjustment of the individual bars to effect any desired coded selection within the ample limits afforded by the individual bars and all of the possible numerous permutations of the bars working together. These barrier bars may be made from any desirable thin flat selfsustaining material such as nonmagnetic metal, hard synthetic plastic, and the like. They are mounted in front-to-rear spaced parallel coextensive relation in vertical planes and with their lower edges substantially aligned with a plane across the lower card tab engaging surfaces of the retrieval conveyor belts 47 where they pass over the card tab attracting nips of the retrieval rolls 21. Thereby, such lower edges of the barrier bars 62 are spaced above the upper edges of the card tabs 13 in adequate clearance relation but in substantially the same closely spaced relation as the lower nip portions of the belts 47.

In a compact, efficient construction, each of the selector barrier bars 62 is of generally vertically elongated form with a lower card edge opposing foot portion 63 and an upper bellcrank arm 64 projecting forwardly and upwardly from the body of the bar adjacent to an aperture 65 through the bar providing a bearing edge engaging rockably upon a supporting rod 67 extending between and fixedly supported by the frame members 20 at a suitable position and elevation above the bar 24 and on a parallel axis.

While the barrier bars 62 are mounted for oscillation about the axis of the supporting rod 67, the bar 24 provides spacer means and reciprocation guide for the barrier foot portion 63. For this purpose, the foot portion 63 is provided with a generally horizontally elongated slightly arcuate slot 68 through which is guidingly received a complementary portion of the bar 24 within a respective peripheral groove 69 provided in the bar. There are as many of the peripheral grooves 69 in the bar 24 within the available length of the bar between the magnet wheel abutment shoulders 27 as there are barrier bars 62 to be accommodated. Between each pair of adjacent slots 69 this arrangement provides a spacer flange 70 integral in one piece with the bar 24. Assembly of the barrier bar 62 with the guide bar 24 is facilitated by shaping the bar 24 with opposite parallel flats 71 (FIG. 8) spaced apart slightly less than the width of the slots 68 in the barrier bars and with the length between the edges of the spacer 70 sufficiently shorter than the slot 68 so that after the barrier bars 62 are mounted on the supporting rod 67 and properly oriented with respect to their respective guide slots 69 in the bar 24, the bar 24 can be turned from a generally horizontal alignment of the spacer flanges 70 to clear through the slots 68 in assembly of the barrier bars on the bar 24, into a generally vertical alignment of the flanges 70 whereby to maintain the barrier bars 62 in substantially accurately spaced parallel relation along the bar 24. In this turning orientation of the bar 24 relative to the barrier bars 62, loosening of the retaining screws 25 at the ends of the bar 24 permits the turning and after the bar has been turned into the spacer position with respect to the barrier bars a positive lockingly retained position of the bar 24 is effected by tightening the screws 25.

A range of reciprocal movement of the barrier foot portions 63 is permitted by the length of the slots 68 in respect to the diameter of the encompassed portions of the rod 24 serving as reciprocation limit stop engageable with the opposite end edge portions defining the slot of the associated barrier bar.

Each of the selector barrier bar foot portions 63 is provided with a selector extremity portion located between the guide bar 24 and the opposing edges of the cards 11 and affording a barrier edge 72. This edge functions in the rearward disposition of the barrier foot 63, as best seen in FIGURE 1, to restrain the magnetic tabs 13 of adjacent cards from being attracted onto the in-running or rear side of the magnetic rolls 21 during relative sorting movement of the retriever and during return relative movement of the retriever serves as a stripper or barrier against extraction of cards on the rear side of the magnetic rolls 21. To facilitate these functions of the edge 72 it is desirably formed on a smooth curve rearwardly leading into a substantially flat though preferably slightly convexly arched main portion nearest the plane of the extraction nips of the magnetic rolls 21. Thereby, in the rearward position of the selector foot 63 of the barrier bar the barrier edge 72 generally converges toward the magnetic roll nip plane and the normal plane across the tops of the card tabs 13 and smoothly pushes upwardly projecting or magnetically upwardly drawn cards back toward the normal plane of the card tab edges during sorting relative travel of the retrieval unit 10.

Means are provided for smoothly pushing any upwardly projecting cards back downwardly toward the normal exposed edge plane during return relative travel of the retrieval unit 10 and the pack of cards 11. For this purpose the front end portion of the barrier bar foot portion 63 is provided with a lead-in edge portion 73 facing generally forwardly and toward the exposed card edges and converging with the barrier edge 72. In addition, an oblique lead-in edge 74 is provided on the forward lower portion of each of the multiple function plate members 48. This downwardly and forwardly facing lead-in edge 74 serves in the return movement of the retriever 10 to push down toward the normal plane the exposed edges of upwardly projecting cards as they are encountered and has a smooth transitional convergence with a lower stripper edge 75 on each of the respective plates 48 providing, in effect, a stripper bar extending parallel to and in such close relation to the normal exposed edge plane of the stored cards as to maintain the cards against upward displacement throughout a substantial distance forwardly from the retrieval rolls 21. This length of the stripper bar edges 75 is correlated with the front-to-rear extent of the hypotenuse of the conveyor edge 51 of the respective plate 48 to avoid frictional pull-up or travel of rejected cards as the selected card 11 is being withdrawn from the file during a sorting run of the retriever.

At its rear end portion, the stripper bar edge 75 is provided with an inset area 76 affording a limited clearance space over the tab encased exposed edges of the cards 11 to facilitate magnetic extraction where due to relatively tight packing of the stored cards or other reason there may be a tendency for companion cards to resist frictionally at least initial extraction movement of a selected card. At its forward end portion this inset clearance edge section 76 tapers toward convergence with the main closely spaced portion of the edge 75 to push rejected cards back into the pack during sorting travel of the retriever. At its rear end, the clearance edge section 76 converges with the lower extremity of the conveyor edge 51, adjacent to the lower extremity of the associated magnetic conveyor bar 53. During return run of the retrieval unit 10 any card tab 13 that may be drawn upwardly toward the magnetic retrieval means within the clearance space under the edge section 76 is engaged and pushed downwardly by the back running conveyor belt 47 or by engagement with and downward deflection by any of the front end barrier bar edges 72 that may be encountered.

Cooperation between the barrier bar foot portions 63 and the stripper bar members 48 enables coded selection of the cards 11 during relative sorting travel of the retrieval unit 10 and the pack of cards in the receptacle 12. For this purpose, when any one or more of the barrier bars 62 is disposed with its selector foot portion 63 projected forwardly, as exemplified in FIGURES 1 and 3, the forward extremity of the foot portion and the rearmost extremities of the stripper plate members 48 are correlated to preclude and reject all of the cards except any card that has a selected coding arrangement corresponding to the forwardly projected selector barrier bar or bars. For this purpose, the upper or exposed margins of the cards 11 are provided with coding notches 77 (FIGS. 2 and 6) which are slightly wider than the thickness of the barrier bars 62 and of sufficient depth to clear the selector foot portion 63 of the corresponding selector bar. These notches 77 are adapted to be cut or punched in any suitable punching device which will effect a clean, substantially burr-free cut out in the tab strips 13 of the cards. As many or few of the coding notches 77 in individually spaced or cumulative area relationship may be provided on the available edge portions of the cards as will provide the extensive number of coding permutations in the digital system for which the present device has been provided. Only any card which has clearance notches 77 corresponding to the code set barrier bars can escape such set barrier bars while all other cards are retained in the file card pack during a sorting run of the retrieval unit 10.

In the exemplary device illustrated, provision has been made for selector barrier bars 62 numbered from 1 to 120 (FIGS. 1 and 2) individually identifiable as by means of suitable legends carried by a keyboard or control panel 78 associated with selector barrier bar setting mechanism. Conveniently, the control panel 78 is mounted in a generally upwardly and forwardly facing position above the set of barrier bars 62 on respective front and rear frame bars 79 and 80 extending between and secured to the side frame plates 20 as by means of screws 81. In a practical form, respective setting keys or handles 82 projecting through clearance slots 83 in the control panel 78 are conveniently arranged as, for example, in the staggered relationship shown, to be individually manually shifted to effect setting movement of respective setting bars 84 associated with the selector barrier bars 62.

Figure 5:
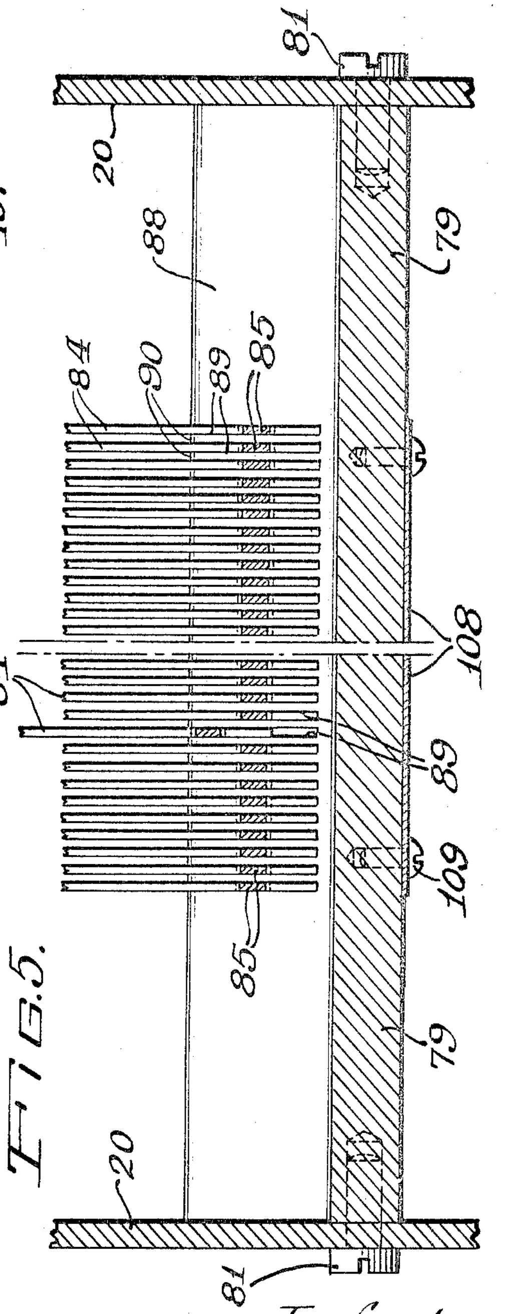
FIGURE 5 is an enlarged fragmental sectional elevational detail view taken substantially on the line V—V of FIGURE 1.

Each of the setting bars 84 is a flat elongated strip of material of preferably substantially the same gauge or thickness as the barrier bars 62 and mounted in coplanar association with its barrier bar. An articulated connection between the setting bar 84 and the bellcrank lever arm 64 of its companion barrier bar is desirably effected by engagement of a journal head 85 of semicircular outline on the extremity of the crank arm in a complementary bearing notch 87 opening from the adjacent longitudinal edge of the setting bar. This affords partial support for the setting bar 84 by its barrier bar 62 under the control panel 78 and, in the illustrated example, adjacent to the lower end portions of the setting bars near the supporting frame bar 79 which provides spacer and retaining means to maintain the articulated connection against any possibility of misalignment in the assembly. A simple structure for this purpose comprises a spacer comb rib 88 (FIGS. 1 and 5) projecting from the adjacent face of the frame bar 79 and provided with guide slots 89 corresponding to and slidably receiving the articulated connections and providing spacer and retainer comb-like finger or flange projections 90 between adjacent setting bars 84. Within the guide slots 89 the forward end portions of the setting bars 84 and the associated connector heads 85 are freely slidably reciprocably movable but positively retained against sideward separation.

Figure 4:
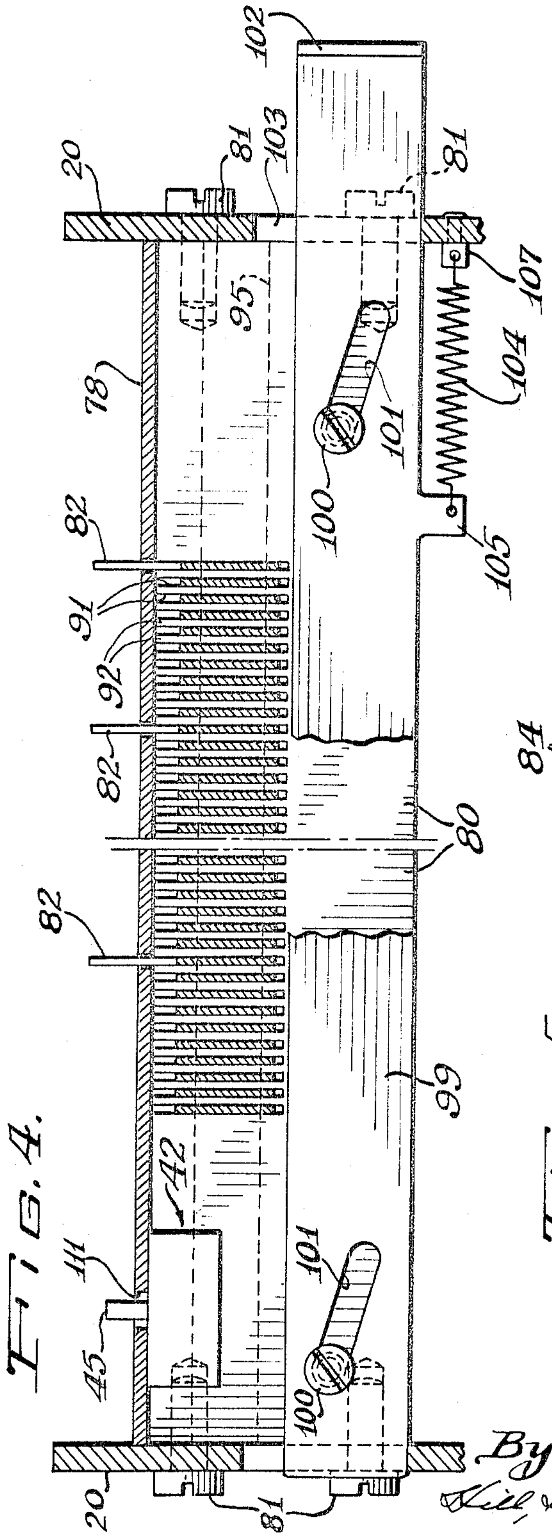
FIGURE 4 is an enlarged fragmental sectional elevational detail view taken substantially on the line IV—IV of FIGURE 1.

At their rear, upper end portions, the setting bars 84 are reciprocably slidably supported by the frame bar 80 (FIGS. 1 and 4). For this purpose, the frame bar 80 is provided with a set of comb-like upwardly opening slots 91 corresponding in number to and complementary in width to the setting bars 84 and defined by guiding and spacer flanges 92 between adjacent setting bars.

Each of the setting bars 84 has its adjacent end portion extending through the corresponding guide slot 91 and with an extremity tail extension 93 projecting rearwardly beyond the frame bar 80 and provided with a rearwardly and downwardly facing inset edge portion 94 engageable upon the opposed edge of a detent or fixed latch plate 95 fixedly carried by the rear side of the bar 80. At the front end of the inset edge portion 94, a diagonal lead-in cam edge 97 leads to a downwardly opening detent notch 98 opening from the edge of the setting bar and receptive of the detent or latching edge portion of the plate 95 when the setting bar 84 is moved into a code set position, that is moved upwardly and rearwardly for thereby swinging the corresponding selector barrier bar 62 into code determined or set position.

For releasing the code set setting bars 84 from the latch plate 95, a manually operable clearing device 99 is provided on the frame bar 80 under the setting bars forwardly from the detent notches 98. In a desirable form, the clearing device 99 comprises an elongated plate bar held in slidable relation on the front face of the frame bar 80 by screws 100 affording spaced apart cam studs extending through parallel spaced apart cam slots 101 in the bar 99. Thereby, the clearing bar 99 normally underlies the setting bars 84 in clearance relation but upon pressing inwardly on a handle extension end portion 102 of the bar projecting through a clearance aperture 103 in the preferably right-hand side frame plate 20 (FIGS. 2 and 4) the clearing bar 99 moves upwardly in clearing relation to the setting bars 84 and tips their adjacent end portions into detent latch clearing position. Normally the clearing bar 99 is held in inactive position by biasing means such as a tension spring 104 connected between a spring lug 105 on the clearing bar and an anchor stud 107 on the carriage frame member 20 adjacent the handle portion 102.

For positive return of the barrier bars 62 from any code set position and to maintain the barrier bars in a normally unset position, suitable biasing means are provided, comprising in a simple form tension spring structure 108 (FIGS. 1 and 2) mounted on the front frame bar 79 adjacent to and cooperative with the barrier bars. Since the barrier and setting bar system is not only of lightweight construction but also movable with substantial freedom and ease, a convenient form for the biasing spring structure 108 is a comb spring having its solid body portion secured as by means of screws 109 to the front face of the frame bar 79 and with individual resilient spring fingers 110 projecting downwardly and rearwardly and engaging against the front edges of the respective body portions of the barrier bars 62 below the pivotal axis provided by the supporting rod 67. Normally the spring fingers under resilient tension thrust the respective barrier bars 62 into the limit of their unset rearwardly protracted positions. However, the biasing fingers 110 yield readily resiliently and without excessive resistance when the respective barrier bars 62 are set for any selected card selecting code relationship by manipulation of the respective handles 82 to shift the associated setting bars 84 rearwardly into the latched, set relationship. Upon release of the setting bars 84 by manipulation of the clearing bar 99, any set barrier bar 62 is instantly snapped by its biasing spring finger 110 into the normal or unset position.

For manipulative convenience, the motor control switch 42 may be mounted as a unit in a convenient location on the control panel 78 as, for example, underneath the same as shown in FIGURE 4, with the switch operating arm 45 projecting up through a clearance aperture 111 (FIGS. 2 and 4) for manipulation. Suitable instructive legends may be provided on the control panel, as shown, to guide operation of the switch by the switch lever 45.

It will thus be apparent that a file clerk or other person desiring to sort from a pack of the cards 11 any card or cards responding to a particular code designation, need only set the selector mechanism by appropriately manipulating the selector handle or handles 82 corresponding to any descriptor code entry and then either manually drive the retrieval unit 10, or pull the receptacle 12 where it is a drawer, as the case may be, or move the switch lever 45 to the "search" position. Searching for the desired cards then proceeds automatically with all cards corresponding to the descriptor code being magnetically extracted and withdrawn and delivered to the receiving rack of the retriever as it rolls over the exposed edges of the magnetically equipped cards. All cards not responding to the coded setting of the selector barrier bars 62 are rejected and remain in the card file. Cards that have served their purpose may be returned to the storage file haphazardly. A maximum file pack of cards can be stored in the file receptacle 12 by virtue of the normal, vertical hanging disposition of the cards relative to their exposed edge plane, and the manner in which the selected cards are withdrawn while maintained substantially in their vertical respective planes normal to the exposed card edge plane. Since the retrieval unit is small and compact and selfcontained it can be readily moved from one receptacle to another where desired.

It will be understood that modifications and variations may be effected without departing from the scope of the novel concepts of the present invention.

I claim as my invention:

1. In card sorting apparatus for retrieving cards from a pack of cards wherein each card has one edge thereof equipped with code notched magnetic means including respective portions adjacent to the ends of said edge, and with all of such edges of the cards adapted to be disposed in a substantially common plane and exposed for retrieval sorting, a selfcontained retrieval unit comprising:

a supporting carriage frame structure including side frame members having means for supporting the carriage frame structure for relative movement in a path with respect to supporting structure in which said cards are supported with said edges in said common plane, and the carriage frame structure in said relative movement successively traversing said edges of said cards, individual magnetic card extracting means mounted on the carriage frame structure adjacent to each of the respective side frame members for magnetically attracting the respective opposite end magnetic portions of the card edges and spaced substantially apart to leave substantial portions of the card edges between said magnetic end portions available for card selection purposes, card selecting individually settable barrier bars carried by the carriage frame structure between said spaced magnetic card extracting means and having means for setting said bars according to a predetermined code related to said notches to block extraction of all cards except any card that has matching code notches in its edge portion between said end magnetic portions in the course of relative card sorting movement of the unit and the cards, card withdrawing means carried by and having parts operative at each respective side of the carriage frame structure clear of said card selecting means and associated with each of said magnetic card extracting means to effect withdrawal from the remaining cards of any selected card extracted by the magnetic card extracting means, and means carried by the carriage frame structure for driving said card withdrawing means.

2. In card sorting apparatus for retrieving cards from a pack of cards wherein one of the edges of the cards is exposed and the exposed edges have respective magnetic portions and coding means and the sides of the cards have respective lugs projecting in alignment with said edges:

a selected-card retrieval carriage unit constructed and arranged for operative relative longitudinal card selecting and retrieval movement in traversing relation across said card edges;

magnetic roll means mounted on said carriage and having an off-running side for initiating withdrawal of cards from the pack by attracting said magnetic means;

selectively settable code identified card selecting means mounted on said carriage in cooperative relation to said roll and operable to permit only cards having predetermined code responsiveness to be withdrawn by said off-running side during said retrieval movement;

pickoff conveyor means comprising a pickoff belt operatively related to said off-running side of the magnetic roll means and running in the same direction generally tangentially from said off-running side to engage the edge of and divert a preselected card from the off-running side in a path away from the roll;

respective guide means engageable with said lugs of the selected card and extending parallel to said pickoff belt means and in the same direction;

means for driving said magnetic roll means and said belt means in coordinated relation;

card receiving rack means aligned with said guide means at a position remote from said roll means and on which said lugs are engaged after discharge from said belt and guide means;

and means for positively transferring the selected card from the discharge end of the belt and guide means onto and along said rack means.

3. Card sorting apparatus as defined in claim 2, in which said means for transferring comprise respective toothed belts engageable with said lugs, and said first mentioned belt means and said transfer belts are operative about a common rotary shaft.

4. In card sorting apparatus for retrieving cards from a pack of cards wherein one of the edges of the cards is exposed and the exposed edges have respective magnetic portions and coding means and the sides of the cards have respective lugs projecting in alignment with said edges:

a selected card retrieval carriage unit constructed and arranged for operative relative longitudinal card selecting and retrieval movement in traversing relation across said card edges;

magnetic roll means mounted on said carriage and having an off-running side for initiating withdrawal of cards from the pack by attracting said magnetic means;

selectively settable code identified card selecting means mounted on said carriage in cooperative relation to said roll and operable to permit only cards having predetermined code responsiveness to be withdrawn by said off-running side during said retrieval movement;

pickoff conveyor means comprising a pickoff belt operatively related to said off-running side of the magnetic roll means and running in the same direction generally tangentially from said off-running side to engage the edge of and divert a preselected card from the off-running side in a path away from the roll;

means for driving said roll and said belts in coordinated relation;

and respective rigid members presenting conveyor tracks extending parallel to and substantially coextensive with said pickoff belt and in the same direction and engageable with said lugs of the selected card and cooperating with the pickoff belt to complete withdrawal of the card from the pack.

5. Apparatus as defined in claim 4, in which rigid members comprise plates having said tracks as edges thereon, and portions of said plates providing stripper components of said selecting means.

6. Apparatus as defined in claim 4, including a magnetic backup bar substantially coextensive with said conveyor tracks and along which said belt runs in backed up relation and by magnetic attraction of said magnetic portion of the selected card assuring retention of such portion by the running belt and withdrawal of the card from the pack as the magnetic portion of the card is moved by the belt along said conveyor tracks.

7. In card sorting apparatus for retrieving cards from a pack of cards wherein one of the edges of the cards is exposed and the exposed edges have respective magnetic portions and coding means and the sides of the cards have respective lugs projecting in alignment with said edges:

a selected card retrieval carriage unit constructed and arranged for operative relative longitudinal card selecting and retrieval movement in traversing relation across said card edges;

a pair of magnetic rolls and means mounting said rolls rotatably on a common axis adjacent to respectively opposite sides of said carriage unit with a substantial space between said rolls and in position for initiating withdrawal of cards from the pack by attracting said magnetic means;

selectively settable code identified card selecting means mounted on said carriage between said rolls and operable to permit only cards having predetermined code responsiveness to be withdrawn by said rolls during retrieval movement of the carriage unit;

respective pickoff conveyor belts operatively related to said rolls and running in the same rotary direction as the rolls and generally tangentially from the rolls to engage the edge of and divert a preselected card from the rolls in a path away from the rolls;

means for driving said rolls and said belts in coordinated relation;

and respective rigid guide means along said sides of the carriage unit and adjacent to said belts and providing tracks along which said lugs of the selected card move as motivated by said belts.

8. Apparatus as defined in claim 7, including means associated with said rolls and engaging with the exposed edges of the cards in the pack to effect proper alignment of the code notches in such edges with said card selecting means.

9. Apparatus as defined in claim 8, in which said card edges have respective alignment slots therein and said alignment means comprise aligning flanges of larger diameter than and rotatably related to said rolls and engaging in said slots.

10. In card sorting apparatus for retrieving selected cards from a pack of cards wherein one of the edges of the cards is exposed in a substantially common plane and has a magnetic portion and code notches opening through said edges:

a carriage constructed and arranged for relative longitudinal movement of the carriage and the pack of cards in traversing relation along said card edges;

card withdrawing means mounted on said carriage and including magnetic means operative during said relative movement to attract said magnetic portions of the cards and withdraw the cards from the pack successively in the course of said relative movement;

card selecting means comprising a set of parallel card selecting bars each of which comprises an elongated flat member having a card selecting foot portion on one end having a card opposing edge in closely spaced relation to said card edges and a head portion on the opposite end of the member spaced substantially from said foot portion and from said card edges, means pivotally intermediately mounting said members on a common axis and in coextensive flat side to flat side relation;

means attached to said head portions for adjustably respectively oscillating said members between a nonselecting position and a card sedecting position according to a predetermined code determination wherein only any card that has code notching corresponding to the coded setting of the selected members can escape thereby by virtue of its matching code notches;

and stripper means mounted on said carriage and cooperative with the adjustably code determined set bars to preclude withdrawal of any other than the card having said matching code notches while said magnetic portions are in the magnetic field of the magnetic means during said relative movement.

11. Apparatus as defined in claim 10, in which the foot portions of said bar members have elongated closed end guide slots, and a fixed bar extends through said slots and provides a limit stop upon oscillating adjustment movements of the bar members.

12. Apparatus as defined in claim 11, in which said bar is mounted at its opposite ends on said carriage and extends a substantial distance beyond said card selecting means, and said magnetic means comprises a pair of magnetic rolls rotatably mounted on said bars at the respective opposite sides of said selecting means.

13. Apparatus as defined in claim 12, in which said card withdrawing means includes respective pickoff belts engaging about said rolls, and means for driving said rolls and said belts in unison.

14. Apparatus as defined in claim 11, including a card receptacle structure having longitudinally upwardly extending carriage supporting rails, and rollers rotatably mounted on said stop bar and riding said rails.

References Cited by the Examiner

UNITED STATES PATENTS

| | | | |
|---|---|---|---|
| 873,305 | 12/1907 | Eckart | 129—16.1 |
| 1,217,243 | 2/1917 | Tucker et al. | 129—16 |
| 2,259,463 | 10/1941 | Griffin | 129—16.1 |
| 2,269,767 | 1/1942 | Jayne | 129—16.1 |
| 2,501,492 | 3/1950 | Bergsten et al. | 129—16.1 |
| 2,577,460 | 12/1951 | Gottschalk | 129—16.1 |
| 2,638,215 | 5/1953 | Friedewald | 209—110 |
| 2,647,519 | 8/1953 | Broxten | 129—16.1 |
| 2,908,278 | 10/1959 | Goeruch | 129—16.1 |
| 2,940,584 | 6/1960 | Kunz | 198—41 |
| 2,999,424 | 9/1961 | McCammon | 40—79 |
| 3,007,572 | 11/1961 | Renshaw | 209—110 |
| 3,034,512 | 5/1962 | Hunter | 129—16.1 |
| 3,055,131 | 9/1962 | Novak | 129—16.1 X |
| 3,105,593 | 10/1963 | Fredkin | 209—110 |
| 3,209,892 | 10/1965 | Jones | 198—41 |

FOREIGN PATENTS

| | | |
|---|---|---|
| 915,894 | 8/1946 | France. |
| 1,247,271 | 10/1960 | France. |

JEROME SCHNALL, *Primary Examiner.*